US007454503B2

(12) United States Patent
Childress et al.

(10) Patent No.: US 7,454,503 B2
(45) Date of Patent: Nov. 18, 2008

(54) METHOD TO IDENTIFY TRANSACTIONS AND MANAGE THE CAPACITY TO SUPPORT THE TRANSACTION

(75) Inventors: Rhonda L. Childress, Austin, TX (US); David Bruce Kumhyr, Austin, TX (US); Neil Raymond Pennell, Cedar Creek, TX (US)

(73) Assignee: International Business Machines Corporation, Armonk, NY (US)

( * ) Notice: Subject to any disclaimer, the term of this patent is extended or adjusted under 35 U.S.C. 154(b) by 940 days.

(21) Appl. No.: 10/821,053

(22) Filed: Apr. 8, 2004

(65) Prior Publication Data

US 2005/0262235 A1 Nov. 24, 2005

(51) Int. Cl.
*G06F 15/16* (2006.01)
*G06F 9/46* (2006.01)
*H04L 12/28* (2006.01)
*H04L 12/56* (2006.01)

(52) U.S. Cl. .................. 709/226; 709/223; 370/395.54; 718/105

(58) Field of Classification Search ........................ None
See application file for complete search history.

(56) References Cited

U.S. PATENT DOCUMENTS

| | | | |
|---|---|---|---|
| 5,455,952 A | 10/1995 | Gjovaag | 395/700 |
| 5,596,703 A | 1/1997 | Eick et al. | 395/326 |
| 5,664,106 A | 9/1997 | Caccavale | |
| 5,724,510 A | 3/1998 | Arndt et al. | 395/200.5 |
| 5,909,549 A | 6/1999 | Compliment et al. | 395/200.53 |
| 5,920,699 A | 7/1999 | Bare | 395/200.55 |
| 6,182,136 B1 | 1/2001 | Ramanathan et al. | 709/224 |
| 6,912,534 B2 | 6/2005 | DeBettencourt et al. | |
| 2003/0033402 A1 | 2/2003 | Battat et al. | 709/224 |

FOREIGN PATENT DOCUMENTS

| | | |
|---|---|---|
| EP | 0892531 A2 | 1/1999 |
| WO | WO 9710543 A | 3/1997 |

OTHER PUBLICATIONS

Plummer, "An Ethernet Address Resolution Protocol -or- Converting Network Protocol Addresses to 48.bit Ethernet Address for Transmission on Ethernet Hardware", Network Working Group, Nov. 1982, 10 pages.

*Primary Examiner*—Jason Cardone
*Assistant Examiner*—Azizul Choudhury
(74) *Attorney, Agent, or Firm*—Duke W. Yee; Jeffrey S. LaBaw; Gerald H. Glanzman

(57) ABSTRACT

A monitoring program contains a method for detecting a load imbalance in a group of servers and providing notification so that corrections can be made. An embodiment of the invention reads from the address resolution protocol (ARP) cache to determine which server addresses are present, then clears the ARP cache. The address resolution protocol will repopulate the cache from traffic it snoops and from new requests. By performing this query and clear operation periodically, the tracking program can form a picture of the activity levels of the servers. When a significant imbalance exists, the program notifies a control console for human intervention to solve the problem. The tracking program will periodically write its results to a log file, allowing reports for various time periods to be produced as needed. By this mechanism, not only can an imbalance be quickly detected, but underutilization can be picked up by comparing known capability of a resource to its actual usage.

4 Claims, 5 Drawing Sheets

| IP ADDRESS | MAC ADDRESS | TIME TO LIVE |
|---|---|---|
| 192.168.24.138 | 00:c0:4f:2f:96:1f | 2159 |
| 192.168.231.44 | 00:b0:d0:56:44:fb | 2142 |
| 192.168.174.3 | 00:0b:db:df:80:c6 | 2081 |
| 192.168.174.62 | 00:0b:db:df:70:2f | 2057 |
| 192.168.150.237 | 00:b0:d0:59:b8:2f | 2160 |
| 192.168.232.42 | 00:c0:4f:4c:ff:5b | 1999 |
| 192.168.170.83 | 00:b0:d0:14:cb:6b | 1985 |
| 192.168.158.35 | 00:06:5b:b2:8b:bf | 1956 |
| 192.168.244.150 | 00:b0:d0:59:40:b5 | 1890 |
| 192.168.154.23 | 00:10:b4:b7:06:0c | 1700 |
| 192.168.244.251 | 00:b0:d0:58:29:cf | 1115 |
| 192.168.213.187 | 00:06:5b:b2:9c:69 | 977 |
| 192.168.49.18 | 00:c0:4f:4f:d4:62 | 930 |
| 192.168.244.184 | 00:b0:d0:b7:78:7f | 422 |
| ⋮ | ⋮ | ⋮ |

METHOD TO IDENTIFY TRANSACTIONS AND MANAGE THE CAPACITY TO SUPPORT THE TRANSACTION

BACKGROUND OF THE INVENTION

1. Technical Field

This application relates generally to managing computer services in a timely and economical manner. More specifically, the application relates to monitoring traffic to a group of servers in order to detect when one or more of the servers is not carrying its expected load.

2. Description of Related Art

When configuring any type of computer system, it is important to match the resources to the desired result. Too little in the way of allocated computing resources can mean slow responses, customer dissatisfaction, and a generally poor result. However, allocating too many resources can be wasteful and impact the bottom line of the business. Therefore, getting a good match between the application and the actual capabilities of the respective resources is critical to the financial success of a system. This can be especially true in provisioning systems, where computer resources are provided to and shared among customers and profitability depends heavily on the best use of these resources. However, despite the best efforts in configuring the computer system, the capabilities of the resources are not always fully utilized in the actual real-time situation and may differ from the design configuration in ways that are difficult to discern. For example, popular websites may publish a single address for access, but use this address only for a server that forwards requests to one of a number of transaction servers that manage the actual interaction. Existing programs distribute requests to the various transaction servers, but situations can arise in which these programs do not have all the information they need or the capability to correct the problem.

An example can illustrate. A news service provides a web address that can be contacted for breaking news. This address points to a single web server, which directs the incoming requests to a group of five to ten servers, which is capable of serving the normal load. However, during a major disaster, such as the terrorist attack on the twin towers, the news service can be inundated with requests. Use of a provisioning service, which specializes in providing information technology services very quickly, allows the news service to tie into additional servers for handling the unexpected load, with new requests being diverted to the additional servers. However, according to protocol, the server that first handles a request from a given user continues to handle that request during the entire transaction, so that a large number of users can remain on the original servers, competing for limited bandwidth, even though there are other servers that could provide better service. The existing system may not have the capability to track the number of users accessing a site or to check that the servers, both original and those recently allocated, are being equally utilized.

On the other end of the usage spectrum, a large server with a high capacity may not be utilizing nearly all of its capability, yet the possibility exists that this is not clearly recognized by system management software, since no data is available to track usage. In the past, this information has most frequently been discovered in a post-mortem on a project during failure analysis.

Therefore, it would be desirable to have a mechanism by which an approximation of the usage of the servers could be tracked, so that an imbalance could be noted and corrected.

SUMMARY OF THE INVENTION

The invention provides a monitoring program containing a method for detecting an imbalance between servers and providing notification so that corrections can be made. An embodiment of the invention reads from the address resolution protocol (ARP) cache to determine which server addresses are present, then clears the ARP cache. The address resolution protocol will repopulate the cache from traffic it snoops and from new requests. By performing this query and clear operation every few seconds, the monitoring program can form a picture of the level of activity of the various servers. When a significant imbalance exists, the program sends a message to a control console so that the problem can be noted and resolved. The monitoring program can periodically write its results to a log file, allowing reports for various time periods to be produced as needed. By this mechanism, not only can an imbalance be quickly detected; underutilization can also be picked up by comparing the expected usage pattern of a resource to its actual usage.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1A depicts a pictorial representation of a provisioning system connected to the Internet, while

DETAILED DESCRIPTION OF THE PREFERRED EMBODIMENT

Figure 1A:
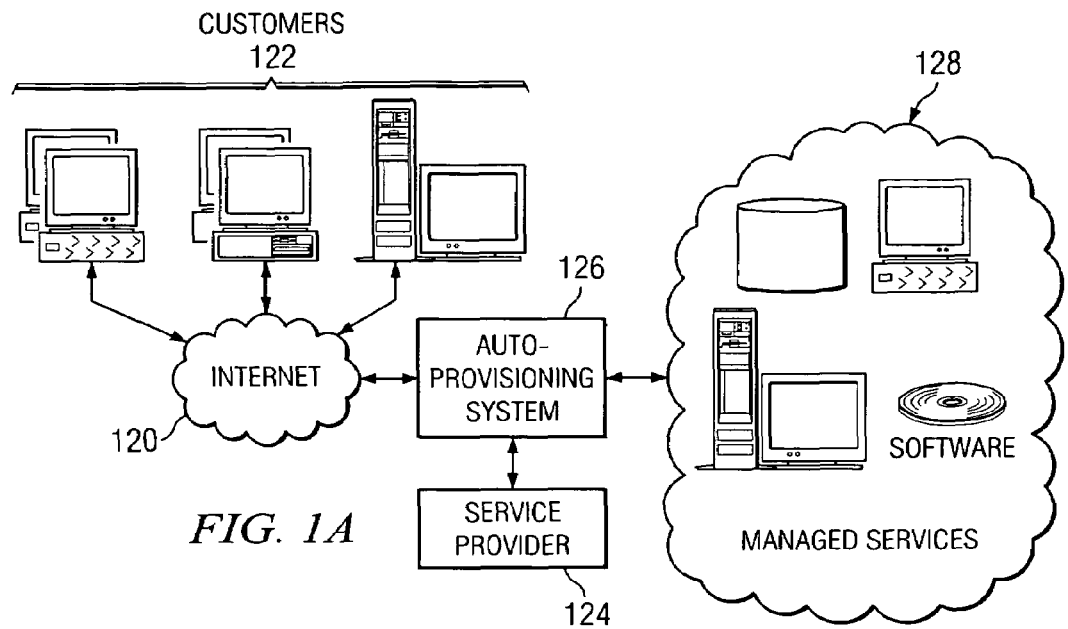

With reference now to the figures, FIG. 1A depicts the use of a provisioning system that provides services to customers through the Internet 120. A service provider 102 offers a variety of managed services 104. These services can include, but are not limited to, servers, terminals, disk space, and a wide variety of software. Customers 122 desiring the services 128 can contact the provider 124 through the Internet 120 or by other means (not shown) such as telephone. The provisioning is then managed by the auto-provisioning system 126. Contractual agreements can take a variety of forms. For example, a customer can contract with the service provider 124 to install a server and terminals at the customer's site, with terminals being added by the provider 124 as the customer 122 adds personnel. Upgrades to the software can be automatically downloaded to the customer's computer by the auto-provisioning system when a request is received. A second customer can have a business in which the computing needs vary considerably over time as different projects are started and finished. This customer can have basic computer equipment on site as necessary, but contract to utilize servers, storage, and software from a service provider for the lifetime of a project. Such a third party provisioning system is described in U.S. patent application Ser. No. 20020169876, titled "Method and System for Third Party Resource Provisioning Management", which is hereby incorporated by reference.

Figure 1B:
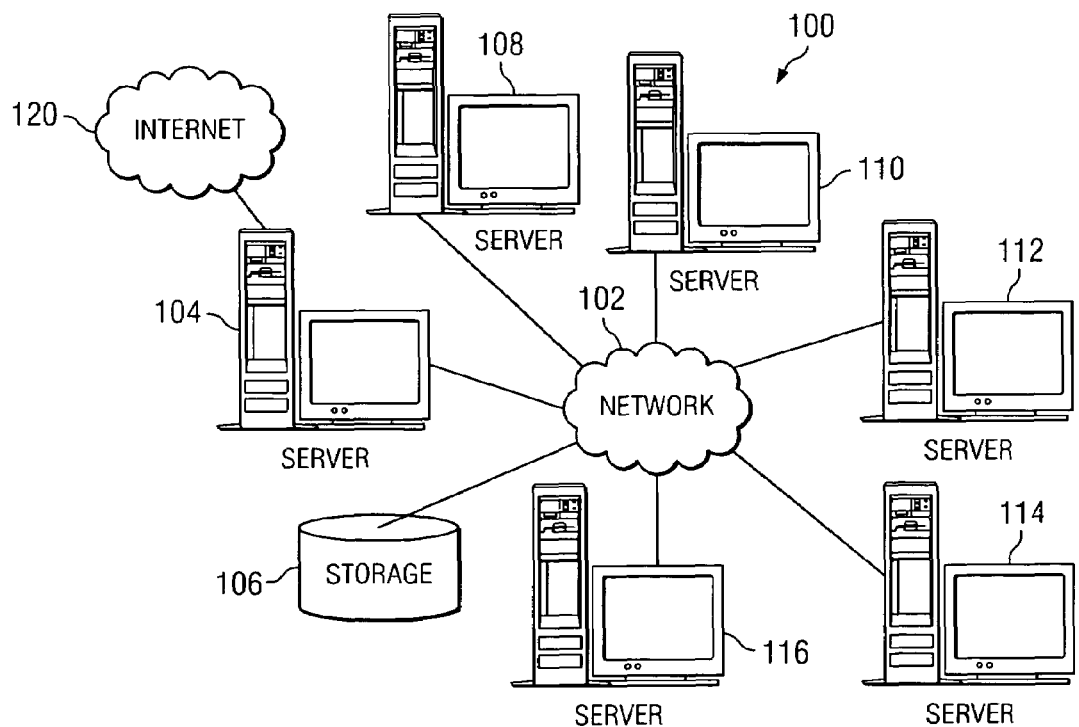
FIG. 1B depicts a group of servers that can be part of the resources managed by the provisioning system and in which the inventive monitoring program may be implemented

FIG. 1B depicts a pictorial representation of a network of data processing systems which can be provisioned by the provisioning system 126 of FIG. 1A and in which the present invention may be implemented. Network data processing system 100 is connected to the network 102, which is used to provide communications links between various devices and computers connected together within network data processing system 100.

In the depicted example, server 104 is connected to network 102, as well as to the Internet 120. In addition, storage unit 106 and servers 108, 110, 112, 114, and 116 are connected to network 102. In the depicted example, the address of server 104 is provided as a contact point for users on the Internet. However, server 104 then forwards the requests to the other servers 108-116. Server 104 will have a program that performs load balancing among the servers, to spread the load as evenly as possible, but the load balancing is "sticky", i.e., once a request is sent to a given server, such as server 110, all requests from that user will remain with the same server during that session. During times of heavy loads, provisioning system 126 can provide additional servers to handle the workload. Network data processing system 100 may include other devices not shown. In the depicted example, network data processing system 100 is connected to the Internet 126 through server 104. Internet 126 represents a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Network data processing system 100 can be implemented as a number of different types of networks, such as for example, an intranet, a local area network (LAN), or a wide area network (WAN). FIG. 1 is intended as an example, and not as an architectural limitation for the present invention.

Figure 2:
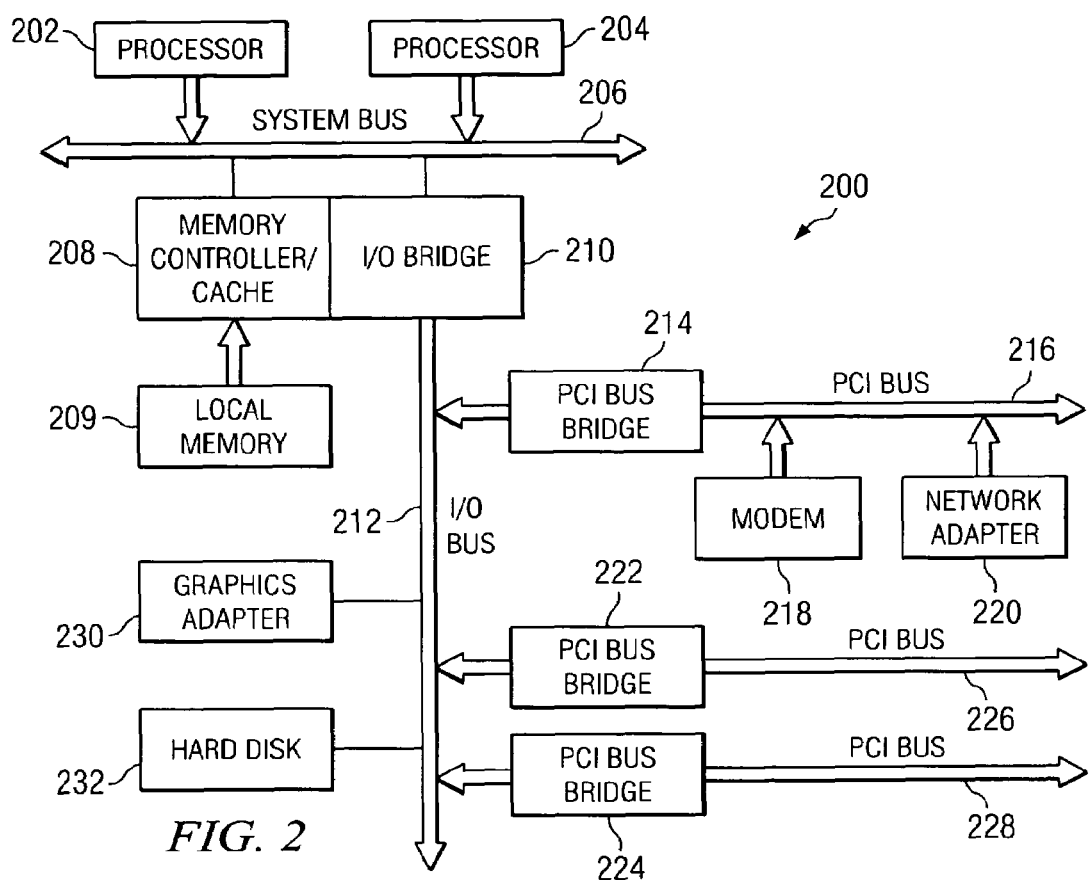
FIG. 2 depicts a block diagram of a data processing system that may be implemented as a server.

Referring to FIG. 2, a block diagram of a data processing system that may be implemented as a server, such as one of the servers 104-116 or a server that is part of the provisioning system 126 is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

In order to communicate, all network devices have a unique, manufacturer-defined, Media Access Control (MAC) address by which they can be identified. A MAC address contains 6 bytes, written as twelve hexadecimal digits, with each pair separated by colons. An exemplary MAC address would be 0A:4B:00:00:07:08. An internet protocol (IP) address, on the other hand, is the address for a connection between a device and the Internet. IP addresses are divided by region and assigned by local registries within the region, such as Internet Service Providers (ISPs). IP addresses are four bytes, with a format that is dependent on the class that the address falls into. An exemplary IP address with a binary address expressed as 10000000 00001011 00000011 00011111 would be written as 128.11.3.31. Within a single network, such as network 102 of FIG. 1B, hosts are known by their MAC address, although higher-level protocols, such as TCP/IP, address the host by symbolic addresses, such as IP address.

When a computer desires to send a message to a given IP address, this IP address must be translated into a physical hardware address (MAC) that the lower level devices can understand. This translation is provided by the Address Resolution Protocol (ARP), which maintains a lookup table, referred to as the ARP cache, for this purpose. If the ARP does not already have the MAC address in its cache, a request for this information is broadcast to the network.

Figures 3, 4:
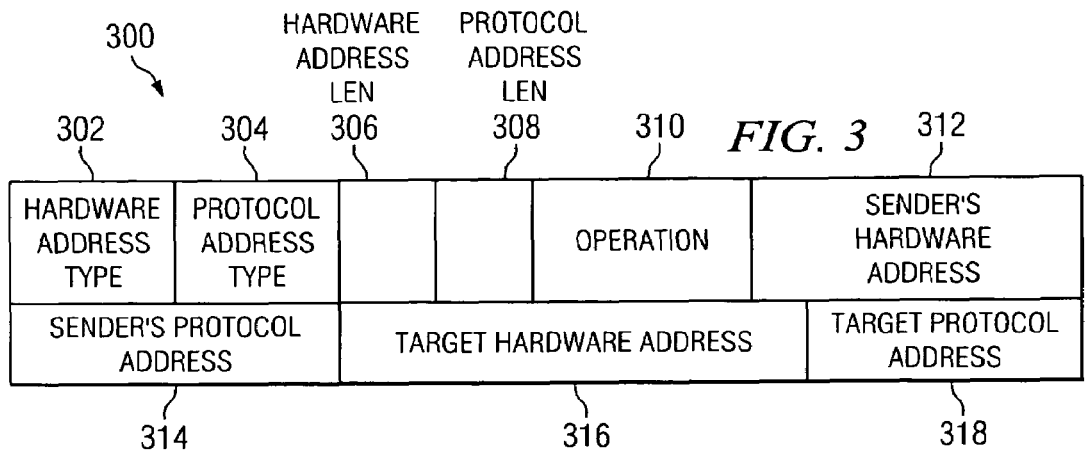
FIG. 3 depicts an exemplary ARP request record.
FIG. 4 depicts a portion of an exemplary ARP cache according to an exemplary embodiment of the invention.

With reference to FIG. 3, the format of an ARP request message 300 is shown. The first two bytes of the message are the hardware address type 302, with "1" signifying Ethernet. The second two bytes are the protocol address type 304, with 0x0800 signifying IP. A one-byte hardware address length field 306 and a one-byte protocol address length field 308 are the next two bytes, followed by a two-byte operation code 310, in which "1" signifies a request, "2" signifies a response. The next six bytes are the sender's MAC address 312, followed by a four-byte sender's IP address 314, six bytes for the target's MAC address 316, and a four byte target's IP address 318.

Prior to sending an ARP request, the computer fills in its own MAC address 312 and IP address 314, fills in the target's IP address 316, sets the operation code 310 to "1", and sets the target's MAC address to zeros. This request is then broadcast; at the same time, the target's IP address is added to the ARP cache, with an indication that a request has been sent. When the sender receives a response, it will store the receiver's MAC address with the corresponding IP address in the ARP cache, while at the same time marking the entry as completed. At the other end of the request process, the target machine will recognize its own address and respond to the request with two actions: first, the target will save the sender's addresses to its own cache, since it will likely be receiving additional contacts from this source; second, it responds to the message, providing its own MAC address. Other computers that do not recognize the address as their own will discard the broadcast message.

If the ARP request does not does not elicit a response within the individual network, the request will be broadcast to other network hubs to locate the desired connection. In this case, the physical hardware address is returned with route information added. The ARP cache maintains the contact information for a predetermined length of time, which may or may not depend on whether the information is accessed again. When the predetermined interval passes, e.g., ten minutes, the address will be deleted so that the spade is made available for more recent addresses. The time limit for an ARP entry to time out, as well as whether or not this time limit can be updated, is governed by the operating system being used.

FIG. 4 demonstrates a simplified exemplary ARP cache 400. In this system, the Address Resolution Protocol not only saves addresses received through requests; it also snoops communications streaming past it and adds any addresses that are not already present in the cache. The exact format of the ARP cache can vary from system to system; the cache shown in this drawing contains only that information that is necessary to the invention. In cache 400, there is a record for each active address, showing at least the IP address 410 of a server or client, the corresponding MAC address 415, and a time field 420. The time field 420 is used to determine when an entry should be removed from the table, either when a set period of time has passed or else when the address has not been active for the set period of time. Exemplary cache 400 uses a time-to-live (TTL) field. In this system, a time value of 2160 seconds is inserted into this field when the entry is added to the cache. This value will be decremented by one each second; if it reaches zero, the space if freed for use by another address. However, each time the associated address is either requested or snooped, the TTL field is reset to the beginning value of 2160. In this manner, the entry will remain in the cache as long as the address is active, plus 2160 seconds. A system can also use the reverse idea and set a counter to zero on entry, then increment the counter each second until it reaches the limit, when the space is freed. If the counter can be reset to zero, the entry will remain in the cache as long as the entry has regular activity, but if the counter cannot be reset, the entry will only remain in the cache a fixed length of time.

When the inventive program is used, the program periodically clears the ARP cache. When the clearing is performed frequently, the cache will only contain addresses that have been active since the last time the cache was cleared. The inventive program, when first installed, typically checks the cache and clears it approximately once every second. By monitoring how fast the relevant servers are re-added to the cache, the program can determine an approximation of the activity of the servers.

Figures 6, 7:
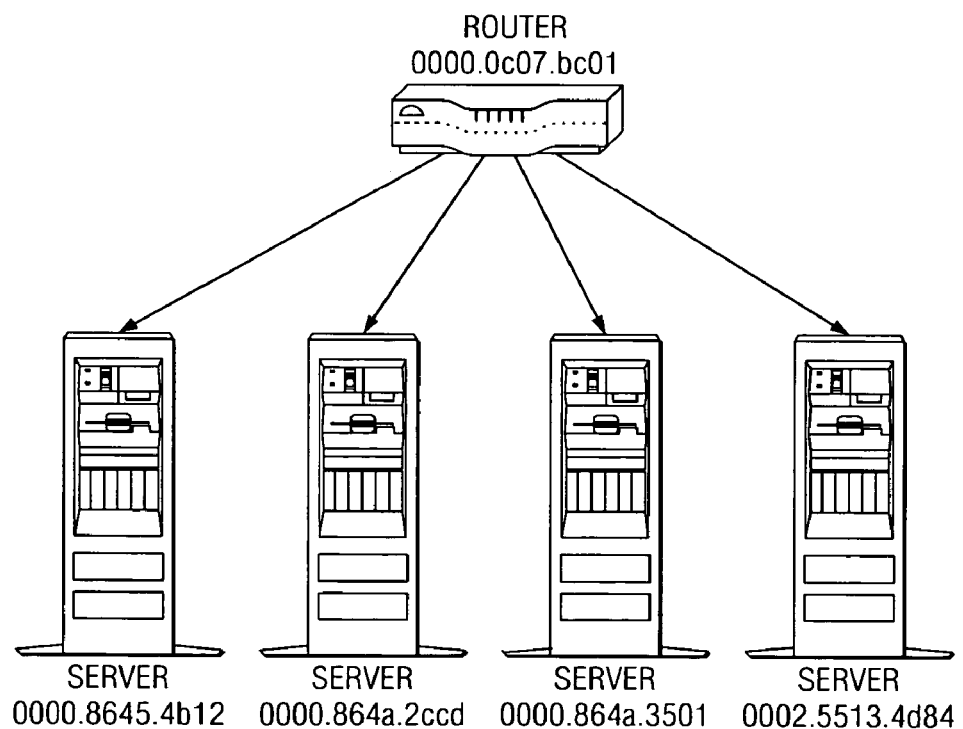
FIG. 6 depicts a table used to track activity of respective servers according to an exemplary embodiment of the invention.
FIG. 7 depicts a network and associated IP addresses to illustrate how a problem can be detected.

As the cache dump is checked, information is stored in the table shown in FIG. 6. Table 600 contains fields for a server address 602 and for a counter 604 associated with the server. Each time a server address 602 is found in the cache dump, its respective counter 604 is incremented.

Figure 5:
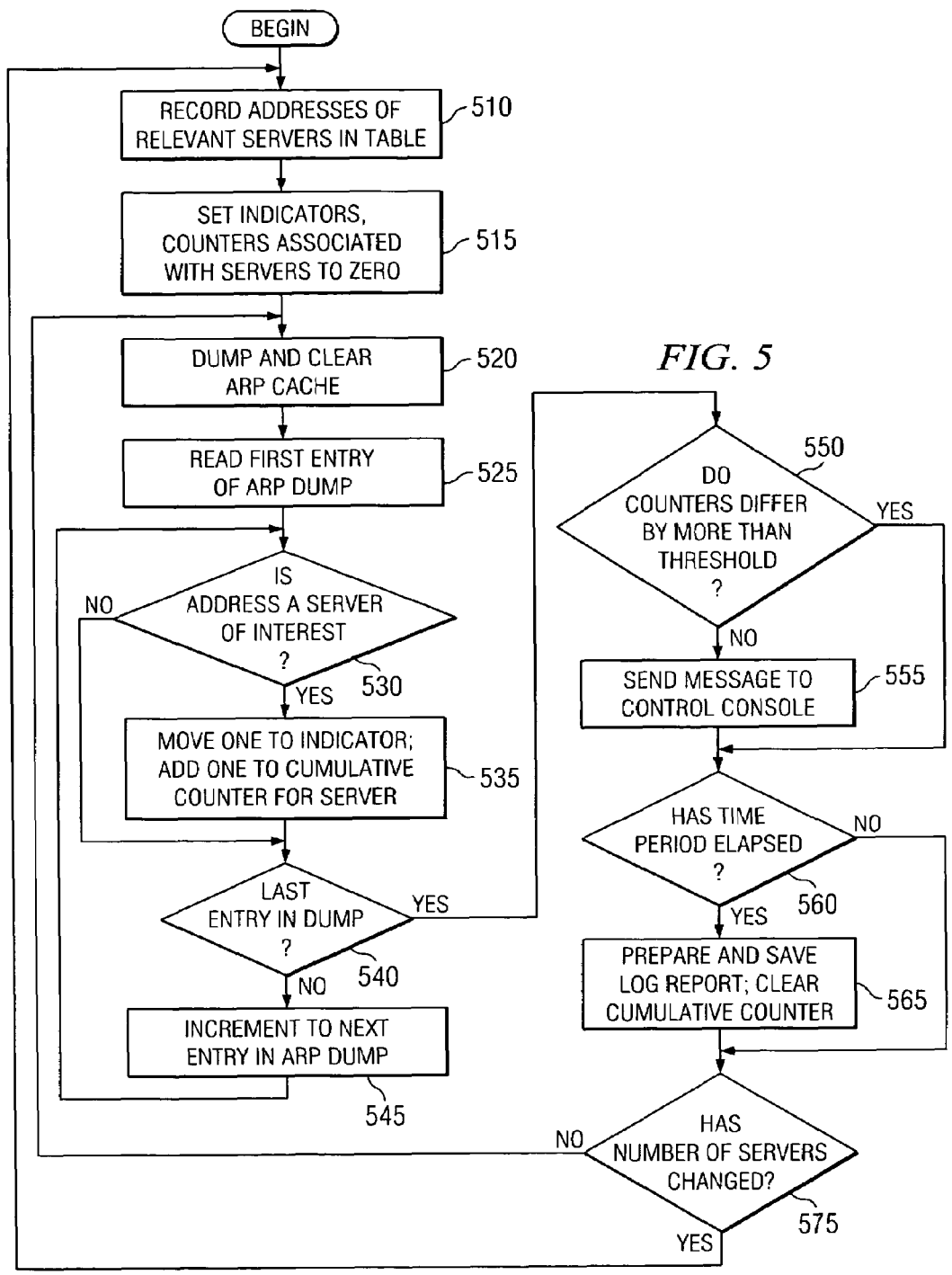
FIG. 5 depicts a flowchart of the actions of a monitoring program that is monitoring server usage according to an exemplary embodiment of the invention.

With reference now to FIG. 5, we can see the actions necessary to compare the level of usage of a number of servers, according to an exemplary embodiment of the inventive program. The program is installed on a gateway server (e.g., 104) that serves as an interface between a network (e.g., network 102) and the larger Internet. All packets routed to this network will pass through a router associated with server 104, so that the ARP cache contains information regarding the usage of servers 108-116. For example, the news service mentioned previously would install the inventive program on the server that is located at the published web address.

A list is maintained, accessible to the innovative program, of the addresses servers of interest, e.g., servers 108-116. If the system adds additional servers for a temporary condition, the addresses of these servers are added to the list. As the program begins, the addresses of the servers to be tracked are entered in table 600 as items 602 (step 510). Then, the counters 604 associated with the servers are cleared to zero (step 515). The program begins by dumping the contents of the ARP cache into a work area and clearing the entries in the cache (step 520). In this way, the Address Resolution Protocol can continue working while the innovative program is checking the activity of the servers. The tracking program then looks at the first entry in the ARP dump it has just taken (step 525). A determination is made as to whether the address stored there is the address of one of the servers being tracked (step 530). If the answer is "yes", the counter 604 for the server is incremented by one (step 535); otherwise this step is skipped. The monitoring program then determines whether it is looking at the last entry in the dump (step 540). If not, the tracking program increments to the next entry in the dump (step 545), then returns to step 530 to check the rest of the cache dump.

If the end of the cache has been reached, the tracking program can analyze the information it has collected in table 600. If this is the first time the program has dumped and analyzed the ARP cache, it will only be able to tell if a server has been active within the time period set by the cache, e.g., the last 2160 seconds in the example above. However, as the monitoring program dumps and clears the cache repeatedly, it can build up an idea of whether all the servers are showing up in the cache most or all of the time. It would not be surprising if a server occasionally does not show up in the ARP cache dump, but if this happens frequently, it would generally indicate a problem, especially if other indicators available to the operator show that the server is busy.

The monitoring program compares the counters of the various servers to see if they differ by more than a threshold value (step 550). If the answer is "yes", a message is sent to a control console (step 555), along with copies of the relevant data collected. Thus, this program itself does not correct the problem, but notifies an operator that a suspicious condition exists. The message will be skipped if the loads on the servers do not differ by more than the threshold value.

Periodically, the cumulative totals can be written to a log file and cleared. The time period for logging can vary from minutes to hours or days. Whatever the interval is determined to be, the program will check to see if this time period has elapsed (step 560). If so, a log record or log report is written and the counters 604 are cleared (step 565). Prior to returning to dumping and clearing the ARP cache, the program determines if the number of servers has changed (step 570). In general, this answer will be "no" and the program once again dumps and clears the cache (step 520). If changing conditions have caused the number of servers to be increased or decreased, the program returns to step 510, where the addresses of all the expected servers are recorded in table 600, then the checking begins again.

As in all computer applications, there is a trade-off in this program between providing adequate information and spending so much time tracking the work that there is not time for the actual work to get done. The monitoring program works most effectively by using consecutive, closely spaced dumps of the cache. However, as confidence in the active processes increases, the monitor could be cut back to run, for example, one minute out of every 15 minutes or every hour. In this manner, the program can obtain the data that it needs without running constantly. Of course, the monitoring program can be returned continuous running by operator input, e.g., in a case where other system monitors have indicated that there is a potential system problem.

The detection of an imbalance between servers will now be discussed with reference to FIG. 7. In this example, a single router with IP address 0000.0c07.bc01 sends queries to four different servers at IP addresses 192.168.12.174, 192.168.129.191, 192.168.135.167, and 192.168.135.136. The following tables represent portions of several successive cache dumps and the table that results after the associated iteration of the scan. Note that in this system, the cache uses an age field that is incremented upwards from zero.

| Protocol | IP Address | Age | MAC | Type | Interface |
|---|---|---|---|---|---|
| Internet | 192.168.12.174 | 6 | 0000.8645.4b12 | ARPA | Vlan12 |
| Internet | 192.168.143.168 | 1 | 0002.55c2.0699 | ARPA | Vlan143 |
| Internet | 192.168.129.191 | 5 | 0000.864a.2ccd | ARPA | Vlan129 |
| Internet | 192.168.137.29 | 7 | 0004.bce4.c226 | ARPA | Vlan137 |
| Internet | 192.168.135.167 | 2 | 0000.864a.3501 | ARPA | Vlan135 |
| Internet | 192.168.142.174 | 0 | 0003.47a7.c7ef | ARPA | Vlan142 |
| Internet | 192.168.129.131 | 9 | 0001.0384.0268 | ARPA | Vlan129 |
| Internet | 192.168.135.136 | 35 | 0002.5513.4d84 | ARPA | Vlan135 |
| Internet | 192.168.135.172 | 36 | 0002.8b2a.b65c | ARPA | Vlan135 |

Cache Dump, Time=0

| | |
|---|---|
| 192.168.12.174 | 1 |
| 192.168.129.191 | 1 |
| 192.168.135.167 | 1 |
| 192.168.135.136 | 1 |

Table after 1$^{st}$ Iteration

All of the expected servers were found in this first scan. One second later the dump occurs again.

| Protocol | IP Address | Age | MAC | Type | Interface |
|---|---|---|---|---|---|
| Internet | 192.168.129.191 | 0 | 0000.864a.2ccd | ARPA | Vlan129 |
| Internet | 192.168.143.168 | 0 | 0002.55c2.0699 | ARPA | Vlan143 |
| Internet | 192.168.135.167 | 0 | 0000.864a.3501 | ARPA | Vlan135 |
| Internet | 192.168.12.174 | 0 | 0000.8645.4b12 | ARPA | Vlan12 |
| Internet | 192.168.129.131 | 0 | 0001.0384.0268 | ARPA | Vlan129 |
| Internet | 192.168.142.174 | 0 | 0003.47a7.c7ef | ARPA | Vlan142 |
| Internet | 192.168.137.29 | 0 | 0004.bce4.c226 | ARPA | Vlan137 |
| Internet | 192.168.135.172 | 0 | 0002.8b2a.b65c | ARPA | Vlan135 |

Cache Dump, Time=1

| | |
|---|---|
| 192.168.12.174 | 2 |
| 192.168.129.191 | 2 |
| 192.168.135.167 | 2 |
| 192.168.135.136 | 1 |

Table after 2nd Iteration

This time, three of the servers were located in the dump, but the '136 server was not found. One second later the dump occurs again.

| Protocol | IP Address | Age | MAC | Type | Interface |
|---|---|---|---|---|---|
| Internet | 192.168.129.191 | 0 | 0000.864a.2ccd | ARPA | Vlan129 |
| Internet | 192.168.12.174 | 0 | 0000.8645.4b12 | ARPA | Vlan12 |
| Internet | 192.168.135.167 | 0 | 0000.864a.3501 | ARPA | Vlan135 |
| Internet | 192.168.136.146 | 0 | 0010.b48e.3be5 | ARPA | Vlan136 |
| Internet | 192.168.129.131 | 0 | 0001.0384.0268 | ARPA | Vlan129 |
| Internet | 192.168.142.174 | 0 | 0003.47a7.c7ef | ARPA | Vlan142 |
| Internet | 192.168.137.29 | 0 | 0004.bce4.c226 | ARPA | Vlan137 |
| Internet | 192.168.135.172 | 0 | 0002.8b2a.b65c | ARPA | Vlan135 |

Cache Dump, Time=2

| | |
|---|---|
| 192.168.12.174 | 3 |
| 192.168.129.191 | 3 |
| 192.168.135.167 | 3 |
| 192.168.135.136 | 1 |

Table after 3rd Iteration

Again, the '136 server was not found in the cache dump.

This may be the detection of a problem, but until the threshold is reached, it will not be recognized as such. Let us assume that the threshold is set to 35 seconds and jump ahead in time. Here, at the 36$^{th}$ iteration, is the cache dump.

| Protocol | IP Address | Age | MAC | Type | Interface |
|---|---|---|---|---|---|
| Internet | 192.168.137.29 | 0 | 0004.bce4.c226 | ARPA | Vlan137 |
| Internet | 192.168.12.174 | 0 | 0000.8645.4b12 | ARPA | Vlan12 |
| Internet | 192.168.146.17 | 0 | 0800.5bfc.9eb5 | ARPA | Vlan430 |
| Internet | 192.168.135.167 | 0 | 0000.864a.3501 | ARPA | Vlan135 |
| Internet | 192.168.129.191 | 0 | 0000.864a.2ccd | ARPA | Vlan129 |
| Internet | 192.168.129.131 | 0 | 0001.0384.0268 | ARPA | Vlan129 |
| Internet | 192.168.142.174 | 0 | 0003.47a7.c7ef | ARPA | Vlan142 |
| Internet | 192.168.135.172 | 0 | 0002.8b2a.b65c | ARPA | Vlan135 |

Cache Dump, Time=35

| | |
|---|---|
| 192.168.12.174 | 36 |
| 192.168.129.191 | 36 |
| 192.168.135.167 | 36 |
| 192.168.135.136 | 1 |

Table after 36th Iteration

In this iteration, the difference between the appearances of server '136 and that of the other servers reaches the threshold of 35. At this point, an operator will be notified of the apparent problem.

This method and system provide a way to monitor and report on the activity of a group of servers, enabling an operator to react when changes are needed but were not previously obvious.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for monitoring a comparative load for servers within a group of servers on a network in which a first server forwards requests to a plurality of second servers, said method comprising the steps of:

preparing a first table containing, for each of said plurality of second servers, an address and a respective counter;

dumping a copy of an address resolution protocol cache to a storage area to form a cache dump;

determining, from said cache dump, which of said plurality of second servers are present in said cache dump and for each of said second servers present, incrementing a respective counter;

after said determining and incrementing steps are completed, comparing said plurality of respective counters with each other to determine if a load imbalance between said second servers is greater than a threshold value;

if said load imbalance is greater than said threshold value, sending a message regarding said load imbalance.

2. The method of claim 1, wherein said dumping and determining steps are performed repetitively and said address resolution protocol cache is cleared after each repetition of said dumping step.

3. The method of claim 1, wherein said preparing step is performed initially and then only when a server is added to or removed from said plurality of second servers.

4. The method of claim 1, further comprising the steps of periodically writing values of said counters to a log file and clearing said counters.

\* \* \* \* \*